United States Patent
Bracha et al.

(10) Patent No.: US 7,669,184 B2
(45) Date of Patent: Feb. 23, 2010

(54) INTROSPECTION SUPPORT FOR LOCAL AND ANONYMOUS CLASSES

(75) Inventors: Gilad Bracha, Los Altos, CA (US); Joseph D. Darcy, Mountain View, CA (US); Peter von der Ahe, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 944 days.

(21) Appl. No.: 11/173,976

(22) Filed: Jun. 30, 2005

(65) Prior Publication Data

US 2007/0006141 A1     Jan. 4, 2007

(51) Int. Cl.
*G06F 9/44* (2006.01)
(52) U.S. Cl. ...................... 717/116; 717/118
(58) Field of Classification Search ......... 717/106–108, 717/114–118, 136, 140–148, 165, 131–133; 719/315, 331–332; 718/1
See application file for complete search history.

(56) References Cited

U.S. PATENT DOCUMENTS 6,708,222 B1 *   3/2004   Dalal et al. .................. 719/315
2007/0006141 A1   1/2007   Bracha et al.

OTHER PUBLICATIONS

Sun Microsystems, Inc., "Java 2 Platform Standard Edition 5.0 API Specification: java.lang.Class", Feb. 7, 2004.*
Sun Microsystems, Inc., "Java 2 Platform Standard Edition 5.0 API Specification: java.lang.Proxy", Oct. 10, 2004.*
Kickjava.com, "java.lang.class", Feb. 7, 2005, pp. 4-7.*
David Flanagan, "Java In A Nutshell, 5th Edition", Mar. 15, 2005, O'Reilly Media, Inc., sections 2.11, 3.3 and 3.10.*
Sun Microsystems, Inc., "Java Core Reflection Overview", Apr. 29, 2004.*
Joshua Engel, "Programming for the Java Virtual Machine", Jun. 22, 1999, Addison-Wesley Professional, Chapters 1, 9 and 11.*
Jboss.com, "Bug In getDeclaringClass", Dec. 30, 2004, pp. 1-2.*
Sun Microsystems, Inc. Java 2 Platform Standard Edition 5.0 API Specification: java.lang.reflect.Method, Feb. 7, 2004.*
Javaranch.com, "Accessing Outer Class", Mar. 18, 2003.*

(Continued)

*Primary Examiner*—Lewis A Bullock, Jr.
*Assistant Examiner*—Matthew Sandifer
(74) *Attorney, Agent, or Firm*—Osha • Liang LLP

(57) ABSTRACT

A technique in accordance with one embodiment of the present invention provides introspection support for anonymous and local classes. As a result of the technique, an enclosing class that defines a generic type variable that is not defined within a local or anonymous class that refers to the generic type variable can be determined. According to one embodiment of the invention, when a compiler determines that a particular class is a local or anonymous class, the compiler emits, into the particular class' binary class file, information that indicates which class encloses the particular class. In response to the invocation of a method (described herein) relative to a reflective proxy that corresponds to an enclosed class, information that identifies an enclosing class that encloses the enclosed class is returned. This is so even if the enclosed class is a local or anonymous class.

10 Claims, 2 Drawing Sheets

OTHER PUBLICATIONS

Laura Lemay and Rogers Cadenhead, "Sams Teach Yourself Java 2 Platform in 21 Days, Professional Reference Edition", Sams, Jan. 21, 1999.*

Tim Lindholm and Frank Yellin, "The Java Virtual Machine Specification, 2$^{nd}$ Edition", Apr. 24, 1999, Sun Microsystems Inc., Chapter 4.*

European Patent Office, "Extended European Search Report," App. No. 06253190.0, dated Jan. 22, 2007, 8 pages.

Sun Microsystems, "Java.Lang Class Class <T>", located on the internet at <http://java.sun.com/j2se/1.5.0/docs/api/java/lang/Class.html, retrieved on Dec. 20, 2006, XP002412532, 12 pages.

Sun Microsystems, "Dynamic Proxy Classes," retrieved from the internet at <http://java.sun.com/j2se/1.3/docs/guide/reflection/proxy/html, retrieved on Jan. 3, 200, XP002412534, 6 pages.

Sun Microsystems, "Java.lang.reflect Class Proxy," retrieved from the internet at http://java.sun.com/j2se/1.5/docs/api/java/lang/reflect/Proxy.html, retrieved on Dec. 20, 2006, XP002412533, 5 pages.

Eugster, "Dynamic Proxies for Classes: Towards Type-Safe and Decoupled Remote Object Interaction", 2003, Inforscience, France, pp. 1-18.

Bracha, Gilad, "Generics in the Java Programming Language," [online], Jul. 5, 2004, [retrieved on Jun. 14, 2005]. Retrieved from the Internet: <http://java.sun.com/j2se/1.5/pdf/generics-tutorial.pdf>, pp. 1-23.

Chandra Hundigam, "Understanding the Generic Type in C#," Sep. 2002, The Code Project, pp. 1-4.

* cited by examiner

INTROSPECTION SUPPORT FOR LOCAL AND ANONYMOUS CLASSES

CROSS-REFERENCE TO RELATED APPLICATIONS

The present application is related to U.S. patent application Ser. No. 11/105,116, entitled "INTROSPECTION SUPPORT FOR GENERIC TYPES," by Joseph D. Darcy, filed on Apr. 12, 2005, the entire contents of which are incorporated by reference for all purposes as though fully and originally disclosed herein.

BACKGROUND

Generic Types

Java™ Development Kit (JDK) is a software development kit for producing Java™ programming language (referred to as "JPL" herein) programs. JDK version 1.5 introduced several extensions to the JPL. One of these extensions is the introduction of "generic types."

Generic types in JPL are analogous to, but not exactly the same as, templates in the C++ programming language. Generic types may be most easily understood through a discussion of the scenarios that make the use of generic types beneficial.

According to the syntactical rules of strongly typed programming languages such as JPL, the data type of a variable is supposed to be expressed in the declaration of that variable. The following declaration is illustrative:

Integer x=new Integer(0);

In the above declaration, the variable "x" is declared to be of type "Integer." Thus, any attempt to assign, to "x," an object that not an instance of the "Integer" class or a subclass thereof, should be forbidden and should cause the compiler to alert the programmer that something is amiss in the assignment.

The following declaration is somewhat more sophisticated and informative:

List myIntList=new LinkedList( );

In the above declaration, the variable "myIntList" is declared to be of type "List." When the above expression is evaluated, a new instance of the "LinkedList" class (i.e., a "LinkedList" object) is created ("instantiated") via the invocation of the "LinkedList( )" constructor method and assigned to "myIntList." The "List" and "LinkedList" classes are used as examples in the discussion below, but it should be understood that the behaviors of the classes discussed below are not limited only to these classes.

A variable of a particular type can be assigned objects that are of subtypes of that particular type. Like other variables of type "List," the variable "myIntList" can be assigned "LinkedList" objects, because type "LinkedList" is a subtype of type "List." The "LinkedList" object is a linked list of other objects. Prior to the introduction of generic types in JPL, the compiler could not determine what the specific types of these other objects were. The type system is a conservative approximation of run-time behavior. For example, without generic types, if only "Foo"-type objects were "inserted" into a LinkedList, then the compiler could not determine, upon "extraction" of these objects from the LinkedList, that the objects were of type "Foo." Without generic types, the compiler merely could determine that these objects were instances of some indeterminable subtype of the "Object" class; in JPL, all classes are subclasses of the "Object" class. Because this was as specific as the compiler could get, the "extracted" objects could only have the methods of the "Object" class (as opposed to the "Foo" class) invoked relative to them.

Because of this shortcoming, it often became necessary for a programmer to "cast" such a returned object into a particular data type prior to assigning that object to a variable that was declared to be of the particular data type. The following code is demonstrative:

Integer x=(Integer) myIntList.iterator( ).next( );

In the above code, the "Object" type object returned by the method is expressly cast into an instance of class "Integer." If this cast were not performed, then the compiler might complain that a non-"Integer" type object was being assigned to a variable of type "Integer." Indeed, such a complaint would be beneficial, because if the compiler did not complain about such an assignment, then the compiled program might exhibit unexpected and unwanted behavior if and when the method returned an object that actually was not an Integer.

Having to cast objects in this manner usually irritates programmers and makes source code undesirably verbose and less readable. Some might even consider casting to be a "dirty" programming practice. Fortunately, the advent of generic types in JPL made casting unnecessary, at least for the purposes discussed above. A sample declaration that incorporates generic types follows:

List<Integer> myIntList=new LinkedList<Integer>( );

This is similar to the non-generically typed declaration above, except that the declaration expressly indicates that the objects within the linked list assigned to "myIntList" are going to be instances of class "Integer." In light of the declaration, the compiler knows that every object returned by the "myIntList.iterator( ).next( )" method is an "Integer" object. The compiler will not complain about the expression Integer x=myIntList.iterator( ).next( );

because the compiler can determine that the object returned by the method must be an "Integer" object, and that variable "x" can reference objects of type "Integer." A single declaration makes potentially many casts unnecessary.

It is also should be noted that generic types allow for specificity in this manner without requiring multiple separate implementations of the class. Although "myIntList" is a "List" object that references "Integer" objects, it was not necessary for the programmer to specifically code an implementation of the "List" class to reference only "Integer" objects. Generic types allow a class to be defined once in a generic manner, and then invoked multiple times in different specific declarations.

Due to the more precise approximation of run-time behavior that generic types provide, generic types also help to avoid runtime failures.

An actual example of generic type declarations is shown below:

```
public interface List<E> {
    void add(E x);
    Iterator<E> iterator( );
}
public interface Iterator<E> {
    E next( );
```

```
        boolean hasNext( );
}
```

In the above generic type declarations, the angle bracket-enclosed parameters (e.g., "<E>") are called the "formal type parameters" of the generic types. The specific invocation of such a generic type is called a "parameterized type." For example, the following expression is a parameterized type:

List<Integer>

In the foregoing parameterized type, "<Integer>" is an example of an "actual type argument." Parameterized types specify actual type arguments that are to be put in the place of formal type parameters when the generic type declaration is invoked. Although examples provided below contain only one formal type parameters and only one actual type argument, it should be understood that generic type declarations may specify multiple formal type parameters, and parameterized types may specify multiple actual type arguments.

Although JPL generic types and C++ templates are somewhat similar syntactically and functionally, there are some significant differences between the two. The declaration of a JPL generic type is not expanded into multiple different specific declarations for different actual type arguments. Instead, much like with non-generic type declarations in JPL, a JPL generic type declaration is compiled into a single class file.

Because generic types are so useful, many of the non-generic type declarations that used to exist in the JPL libraries have been replaced with generic type declarations. Non-generic method declarations also have been replaced in these libraries with generic method declarations. In other words, the former non-generic type and method declarations have been "generified." The existing libraries have been generified in a way that allows migration compatibility. Programmers who are writing new JPL programs can make use of the generic types and methods by putting parameterized types in their programs.

Class Taxonomy

Classes may be categorized according to a taxonomy that is based to some extent on where those classes are declared relative to other classes. Some classes are top-level classes, and some classes are nested classes. Top-level classes are classes that are not declared within any other class. In contrast, nested classes are classes that are declared within another class, although perhaps not at the most immediate level.

Nested classes can be categorized further based on whether they are named and are declared immediately within another class. Nested classes that are named and declared immediately within another class are called "member classes." The class in which a member class is immediately declared (i.e., declared no more than one level down) is the "declaring class" relative to that member class. In other words, a member class is a "member" of its declaring class, much in the same way methods and fields may be members of a declaring class.

Some nested classes are not "member" classes. For example, some nested classes are declared within some method that is contained within another class. If a first class is declared within an method that is contained within a second class, then the second class is not a "declaring" class relative to the first class, because the first class is not immediately declared within the second class. Under such circumstances, although the second class is not the first class' "declaring" class, the second class is still the first class' "enclosing" class; the first class is contained within the second class, but is not immediately declared within the second class.

Among these non-member classes are two further subcategories of classes: local classes and anonymous classes. Local classes are declared within an intermediate executable block of code such as a method declaration. Anonymous classes are classes that have no declared name.

In the example code below, class "Local" is a local class, because it is declared within the declaration of method "foo" rather than immediately within the declaration of class "Top." Class "Top" still encloses class "Local":

```
class Top<T> {
    <S> foo (T x) {
        class Local {
            T baz(S s);
        }
    }
}
```

The next example below illustrates an example of an anonymous class with one method, "bar( )":

```
Top<String> x = new Top<String>( ) {
    T bar ( ) {return t;}
}
```

Variables of enclosing classes, including type variables, are included within the scope of the enclosed classes, so the enclosed classes and members thereof are allowed to refer to such variables.

Introspection

It is often useful for a program to have a way of determining, at run time, characteristics of elements of the running program. The ability to determine such characteristics is called "introspection." The JDK Core Reflection Application Programming Interface (API) supports introspection about the classes in the current JPL Virtual Machine (JVM). The Core Reflection API also can be used to construct new class instances and new arrays, access and modify fields of objects and classes, invoke methods on objects and classes, and access and modify elements of arrays. The mechanisms of the Core Reflection API allow certain program elements (e.g., classes, fields, methods, etc.) to have a corresponding "reflective proxy" that indicates information about those program elements.

For example, certain methods of the Core Reflection API return information about the signature of a method, including the types of the method's formal parameters, or the return type of the method. Such information may include generic type-specific information, such as the number and names of generic type parameters.

Because a class may refer to a generic type variable that is defined outside of that class, it is useful to have a way of determining the class in which a particular generic type variable has been defined. The Core Reflection API implements a method called "getDeclaringClass( )." When invoked relative to a reflective proxy that corresponds to a member class, the "getDeclaringClass( )" method returns a reflective proxy that corresponds to the member class' declaring class. If the member class refers to a generic type variable that is defined in the declaring class, then the "getDeclaringClass( )" method can be used to determine the class in which the generic type variable was defined. If the declaring class defines the generic type variable, then the reflective proxy that corresponds to the declaring class indicates this fact. If not, then the "getDeclaringClass( )" method can be invoked relative to that reflective proxy to go one "class level" higher. In many cases, the process may be continued until the class that defines the generic type variable has been determined.

However, in some cases, this process cannot be used to determine the class in which a particular generic type variable has been defined. If the "getDeclaringClass( )" method is invoked relative to a reflective proxy that corresponds to a local or anonymous class, then the "getDeclaringClass( )" method returns "null." This is an entirely correct result, because, as is discussed above, local and anonymous classes are not immediately declared within a class; therefore, there is no declaring class relative to such classes.

Thus, when a local or anonymous class refers to a generic type variable that is defined outside of that class, the "getDeclaringClass( )" method does not provide any way of determining the class in which the generic type variable is defined.

SUMMARY

In accordance with one embodiment of the present invention, there is provided a technique that provides introspection support for anonymous and local classes. As a result of the technique, the class that defines a generic type variable that is not defined within a local or anonymous class that refers to the generic type variable can be determined.

According to one embodiment of the invention, a method called "getEnclosingClass( )" is implemented. In response to the invocation of the "getEnclosingClass( )" method relative to a reflective proxy that corresponds to an enclosed class, information that identifies an enclosing class that encloses the enclosed class is returned. This is so even if the enclosed class is a local or anonymous class. In one embodiment of the invention, the reflective proxy of the enclosing class includes information that indicates which generic type variables are defined by the enclosing class.

According to one embodiment of the invention, when a compiler determines that a particular class is a local or anonymous class, the compiler emits, into the particular class' binary class file, information that indicates the identity of an enclosing class that encloses the particular class. The information in the particular class' binary class file can then be used at run-time to allow the "getEnclosingClass( )" method to determine the particular class' enclosing class.

DETAILED DESCRIPTION OF EMBODIMENT(S)

Overview

In accordance with one embodiment of the present invention, techniques are provided which support introspection for local and anonymous classes. An operational flow diagram, which illustrates a high level overview of the operation of one embodiment of the present invention, is shown in FIG. 1.

Figure 1:
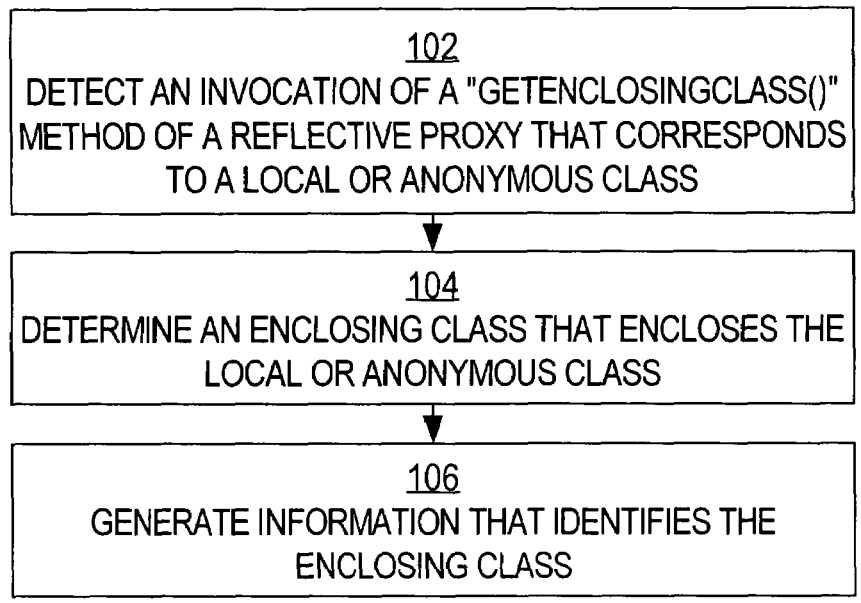
FIG. 1 is a flow diagram that illustrates an overview of the operation of an embodiment of the present invention.

Referring to FIG. 1, in block 102, an invocation of a "getEnclosingClass( )" method of a reflective proxy is detected. The reflective proxy corresponds to an enclosed class that may be a local or anonymous class. For example, the run-time environment of a virtual machine may detect the invocation of such a method. Although the method name "getEnclosingClass( )" is used for purposes of illustration, embodiments of the invention may use a different name for a method that performs the same operations as those described herein in connection with "getEnclosingClass( )."

In block 104, in response to the invocation of the "getEnclosingClass( )" method, an enclosing class that encloses the enclosed class is determined. For example, the run-time environment may determine such information from a binary class file that corresponds to the enclosed class.

In block 106, information that identifies the enclosing class is generated. The information may be returned as a result of the "getEnclosingClass( )" method. For example, the run-time environment may generate and return the information.

In one embodiment, the enclosing class' reflective proxy indicates, among other information, the generic type variables that the enclosing class defines. Thus, in response to the invocation of a particular method of the enclosing class' reflective proxy (e.g., method "toGenericString( )"), information including these generic type variables is returned at run-time.

In other aspects, the invention encompasses, in certain embodiments, computer apparatuses, computing systems, and computer-readable media configured to carry out the foregoing technique.

Emitting Enclosing Class Information at Compile-Time

In one embodiment of the invention, the run-time environment determines a local or anonymous class's enclosing class based on information that is stored in a binary class file that corresponds to the enclosed class. Each class has a separate corresponding binary class file. According to one embodiment of the invention, a compiler stores the identity of the enclosing class in the binary class file in response to determining that an enclosed class is a local or anonymous class.

Figure 2:
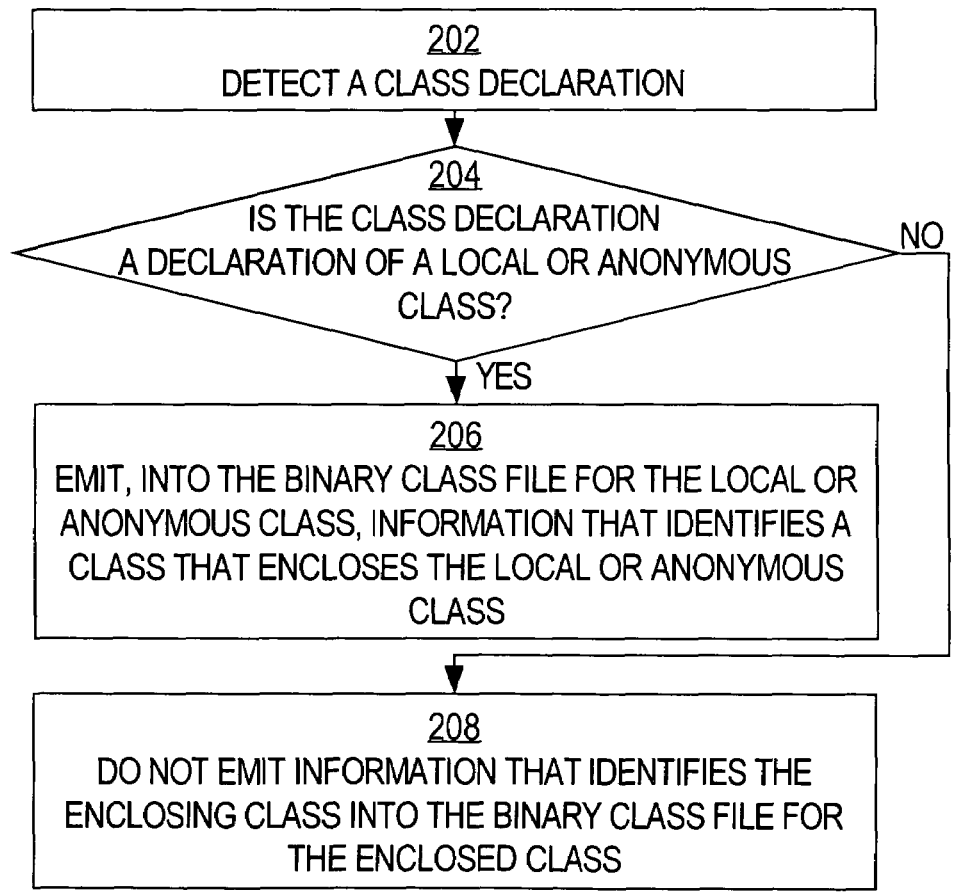
FIG. 2 is a flow diagram that illustrates an example technique for emitting enclosing class identity information at compile-time, according to an embodiment of the present invention.

FIG. 2 is a flow diagram that illustrates an example technique for emitting enclosing class identity information at compile-time, according to an embodiment of the present invention. A compiler may perform such a technique, for example.

In block 202, a class declaration is detected. In block 204, it is determined whether the class declaration is a declaration of a local class or an anonymous class. If the class declaration is a declaration of a local class or an anonymous class, then control passes to block 206. Otherwise, control passes to block 208.

In block 206, information that identifies the enclosing class of the local or anonymous class is emitted into the binary class file for the local or anonymous class. The information may be accessed by the run-time environment in response to the invocation of the "getEnclosingClass( )" method of the reflective proxy that corresponds to the local or anonymous class.

Alternatively, in block 208, information that identifies the enclosing class is not emitted into the binary class file for the enclosed class whose declaration was detected in block 202.

According to one embodiment of the invention, if a particular named class' declaration is contained within a method declaration that is contained within another class' declaration, then the particular class' declaration is determined to be a local class declaration.

According to one embodiment of the invention, if a particular class is declared without a name, then the particular class' declaration is determined to be an anonymous class declaration.

An anonymous class' declaration may be contained in an initialization expression for a field of the enclosing class. In the following example code, an anonymous class is declared in the initialization expression for field "t," which is a member of class "Foo":

```
class Foo<T> {
    T t = (new I( ) {
        T bar ( ) {return null;}
    }).bar( );
}
```

It is possible for a local or anonymous class to be nested within multiple classes. For example, a local or anonymous class may be nested within class "Foo," which may be nested within class "Bar," which may be nested within class "Baz." According to one embodiment of the invention, the enclosing class for a local or anonymous class is the class that most immediately encloses the class. In the previous example, the most immediately enclosing class of the anonymous class is "Foo."

Example Binary Class File Structure

As is described above, in one embodiment of the invention, a compiler emits, into a binary class file that corresponds to a local or anonymous class, information that identifies the class that encloses the local or anonymous class—even if this enclosing class is not a "declaring" class relative to the local or anonymous class. According to one embodiment of the invention, the binary class file contains a structure of the following form, where the types "u2" and "u4" indicate types for unsigned numbers that are two and four bytes long, respectively (for additional information on and definitions of types and constants discussed herein, the reader may refer to *The Java Virtual Machine Specification*, 2$^{nd}$ ed., which is by Tim Lindholm and Frank Yellin, and which is incorporated by reference for all purposes as though fully disclosed herein):

```
ClassFile {
    u4 magic;
    u2 minor_version;
    u2 major_version;
    u2 constant_pool_count;
    cp_info constant_pool[constant_pool_count-1];
    u2 access_flags;
    u2 this_class;
    u2 super_class;
    u2 interfaces_count;
    u2 interfaces[interfaces_count];
```

-continued

```
    u2 fields_count;
    field_info fields[fields_count];
    u2 methods_count;
    method_info methods[methods_count];
    u2 attributes_count;
    attribute_info attributes[attribute_count];
}
```

The "attribute_info" field contains an attributes table. Each value of the attributes table is an attribute structure. According to one embodiment of the invention, each attribute is a structure of the following form:

```
attribute_info {
    u2 attribute_name_index;
    u4 attribute_length;
    u1 info[attribute_length];
}
```

The "attribute_name_index" is an index into the constant pool of the class. The "constant_pool" entry at this index is a structure representing the name of the attribute. For additional information about some of the structures described herein, the reader may refer to *The Java Virtual Machine Specification*.

According to one embodiment of the invention, one kind of attribute that may be contained in the attributes table is an "EnclosingMethod" attribute. According to one embodiment of the invention, only local and anonymous classes have an "EnclosingMethod" attribute. According to one embodiment of the invention, the "EnclosingMethod" attribute has the following format:

```
EnclosingMethod_attribute {
    u2 attribute_name_index;
    u4 attribute_length;
    u2 class_index;
    u2 method_index;
}
```

The "attribute_name_index" is a valid index into the "constant_pool" table. The "constant_pool" entry is a structure representing the string "EnclosingMethod." In the embodiment described above, the value of "attribute_length" is four.

The "class_index" item is a valid index into the "constant_pool" table. The entry at that index is a "CONSTANT_Class_info" structure that represents the innermost class that encloses the declaration of the current class. According to one embodiment of the invention, it is into this structure that the compiler emits information that identifies the enclosing class information for a local or anonymous class. In one embodiment of the invention, a "CONSTANT_Class_info" structure has the following form:

```
CONSTANT_Class_info {
    u1 tag;
    u2 name_index;
}
```

In one embodiment, the "tag" item has the value "CONSTANT_Class," (as is further defined in *The Java Virtual*

*Machine Specification*) and the value of the "name_index" is a valid index into the "constant_pool" table. In one embodiment, the entry at that index is a structure that represents a valid fully qualified class or interface name, which may be encoded.

Additional Introspective Methods

According to one embodiment of the invention, each reflective proxy implements a "getSimpleName( )" method, which, when invoked, returns the simple name of the class that corresponds to the reflective proxy.

According to one embodiment of the invention, each reflective proxy implements a "getCanonicalName( )" method, which, when invoked, returns the canonical name of the class that corresponds to the reflective proxy, as defined by the JPL Specification.

According to one embodiment of the invention, each reflective proxy implements an "is AnonymousClass( )" method, which, when invoked, returns "true" if the class that corresponds to the reflective proxy is an anonymous class, and returns "false" otherwise.

According to one embodiment of the invention, each reflective proxy implements an "is LocalClass( )" method, which, when invoked, returns "true" if the class that corresponds to the reflective proxy is a local class, and returns "false" otherwise.

According to one embodiment of the invention, each reflective proxy implements an "is MemberClass( )" method, which, when invoked, returns "true" if the class that corresponds to the reflective proxy is a member class (i.e., a class that is immediately declared within a "declaring" class), and returns "false" otherwise.

Hardware Overview

Figure 3:
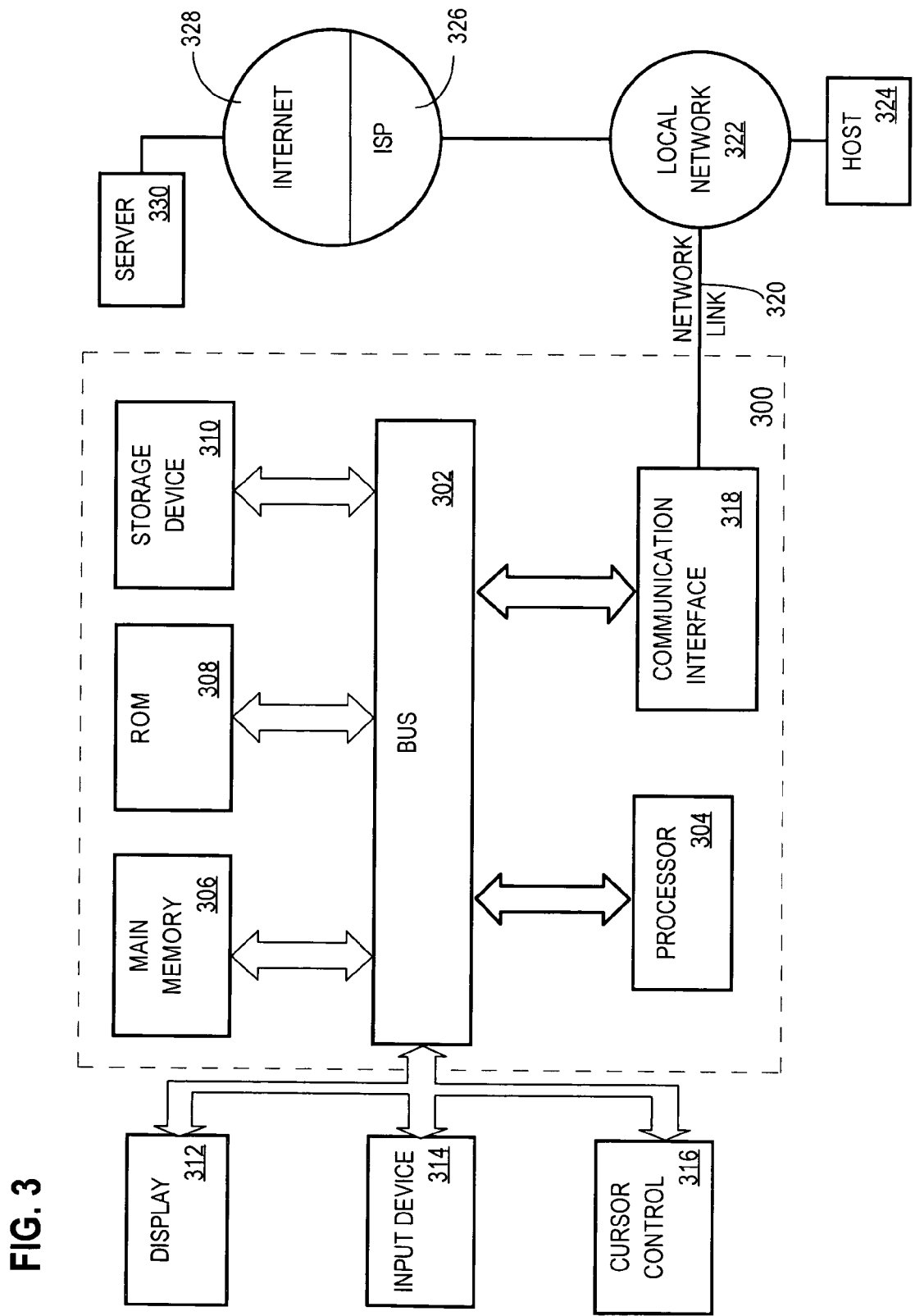
FIG. 3 is a hardware block diagram of an example computer entity, upon which certain embodiments of the invention may be implemented.

FIG. 3 is a block diagram that illustrates a computer system 300 upon which an embodiment of the invention may be implemented. Computer system 300 includes a bus 302 for facilitating information exchange, and one or more processors 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions by processor 304. Computer system 300 may further include a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

In computer system 300, bus 302 may be any mechanism and/or medium that enables information, signals, data, etc., to be exchanged between the various components. For example, bus 302 may be a set of conductors that carries electrical signals. Bus 302 may also be a wireless medium (e.g. air) that carries wireless signals between one or more of the components. Bus 302 may also be a medium (e.g. air) that enables signals to be capacitively exchanged between one or more of the components. Bus 302 may further be a network connection that connects one or more of the components. Overall, any mechanism and/or medium that enables information, signals, data, etc., to be exchanged between the various components may be used as bus 302.

Bus 302 may also be a combination of these mechanisms/media. For example, processor 304 may communicate with storage device 310 wirelessly. In such a case, the bus 302, from the standpoint of processor 304 and storage device 310, would be a wireless medium, such as air. Further, processor 304 may communicate with ROM 308 capacitively. In this instance, the bus 302 would be the medium (such as air) that enables this capacitive communication to take place. Further, processor 304 may communicate with main memory 306 via a network connection. In this case, the bus 302 would be the network connection. Further, processor 304 may communicate with display 312 via a set of conductors. In this instance, the bus 302 would be the set of conductors. Thus, depending upon how the various components communicate with each other, bus 302 may take on different forms. Bus 302, as shown in FIG. 3, functionally represents all of the mechanisms and/or media that enable information, signals, data, etc., to be exchanged between the various components.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operate in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire, and fiber optic cables, including the wires that comprise bus 302.

Common forms of machine-readable media include, for example, a floppy disk, a flexible disk, a hard disk, a magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other physical medium from which a computer can read.

Various forms of machine-readable media may be involved in carrying one or more sequences of one or more instructions to processor 304 for execution. For example, the instructions may initially be carried on a magnetic disk of a remote computer. The remotecomputer can load the instructions into its dynamic memory and send the instructions over a telephone line using a modem. A modem local to computer system 300 can receive the data on the telephone line. Appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the worldwide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

Processor 304 may execute the received code as the code is received and/or stored in storage device 310 or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine-readable medium comprising one or more sequences of instructions stored therein, which instructions, when executed by one or more processors, cause the one or more processors to carry out the steps of:
   in response to an invocation of a first programmatic method of a reflective proxy that corresponds to a first class, identifying a second class that encloses the first class, wherein identifying the second class comprises:
      obtaining a class index from an enclosing method attribute stored in a binary file created for the first class, wherein the class index specifies a first location in a constant pool table stored in the binary file, wherein the binary file is created by a compiler when compiling the first class,
      obtaining, from the first location, a name index for the second class, wherein the name index specifies a second location in the constant pool table, and
      obtaining, from the second location, a name of the second class; and
   returning the name of the second class,
   wherein the first class is one of (a) a local class that is declared within a second programmatic method that is declared within the second class and (b) an anonymous class that has no declared name.

2. The machine-readable medium of claim 1, wherein the second class comprises an initialization expression for a field of the second class, wherein the initialization expression contains a declaration of the first class.

3. The machine-readable medium of claim 1, wherein the steps further comprise:
   in response to an invocation of a third programmatic method of the reflective proxy, determining whether the first class is the local class that is declared within the second programmatic method that is declared within the second class; and
   in response to a determination that the first class is the local class that is declared within the second programmatic method that is declared within the second class, returning "true" as a result of the third programmatic method.

4. The machine-readable medium of claim 1, wherein the steps further comprise:
   in response to an invocation of a third programmatic method of the reflective proxy, determining whether the first class is the anonymous class that has no declared name; and
   in response to a determination that the first class is the anonymous class that has no declared name, returning "true" as a result of the third programmatic method.

5. The machine-readable medium of claim 1, wherein the steps further comprise:
   in response to an invocation of a third programmatic method of a reflective proxy that corresponds to a third class, determining whether the third class is declared immediately within another class; and
   in response to a determination that the third class is declared immediately within another class, returning "true" as a result of the third programmatic method.

6. A computer system comprising:
   a processor;
   a memory for storing a binary file, wherein the binary file is created by a compiler when compiling a first class and instructions executable by the processor,
   wherein the instructions, when executed by the processor, perform a method, the method comprising:
      in response to an invocation of a first programmatic method of a reflective proxy that corresponds to the first class, identifying a second class that encloses the first class, wherein identifying the second class comprises:

obtaining a class index from an enclosing method attribute stored in the binary file created for the first class, wherein the class index specifies a first location in a constant pool table stored in the binary file, wherein the binary file is created by the compiler when compiling the first class, obtaining, from the first location, a name index for the second class, wherein the name index specifies a second location in the constant pool table, and obtaining, from the second location, a name of the second class; and returning the name of the second class, wherein the first class is one of (a) a local class that is declared within a second programmatic method that is declared within the second class and (b) an anonymous class that has no declared name.

7. The computer system of claim 6, wherein the second class contains an initialization expression for a field of the second class, wherein the initialization expression contains a declaration of the first class.

8. The computer system of claim 6, wherein the instructions further cause the processor to:

determine, in response to an invocation of a third programmatic method of the reflective proxy, whether the first class is the local class that is declared within the second programmatic method that is declared within the second class; and return "true" as a result of the third programmatic method in response to a determination that the first class is the local class that is declared within the second programmatic method that is declared within the second class.

9. The computer system of claim 6, wherein the instructions further cause the processor to:

determine, in response to an invocation of a third programmatic method of the reflective proxy, whether the first class is the anonymous class that has no declared name; and return "true" as a result of the third programmatic method in response to a determination that the first class is the anonymous class that has no declared name.

10. The computer system claim 6, wherein the instructions further cause the processor to:

determine, in response to an invocation of a third programmatic method of a reflective proxy that corresponds to a third class, whether the third class is declared immediately within another class; and return "true" as a result of the third programmatic method in response to a determination that the third class is declared immediately within another class.

\* \* \* \* \*